Figure 10:
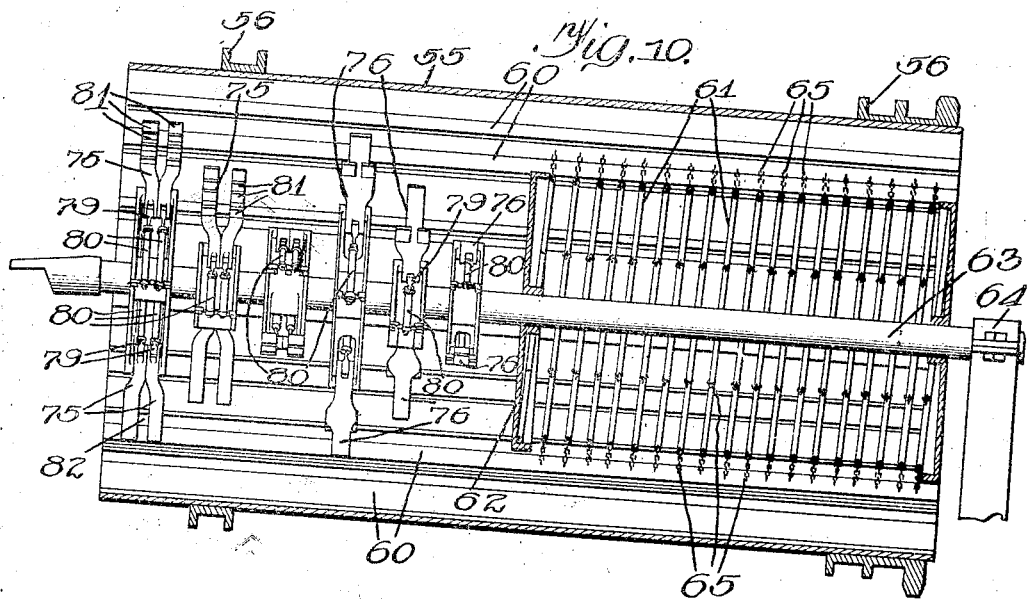

A. HANNAFORD.
HOG SCRAPER AND CONVEYER.
APPLICATION FILED JULY 15, 1907.
1,080,007.
Patented Dec. 2, 1913.
4 SHEETS—SHEET 1.
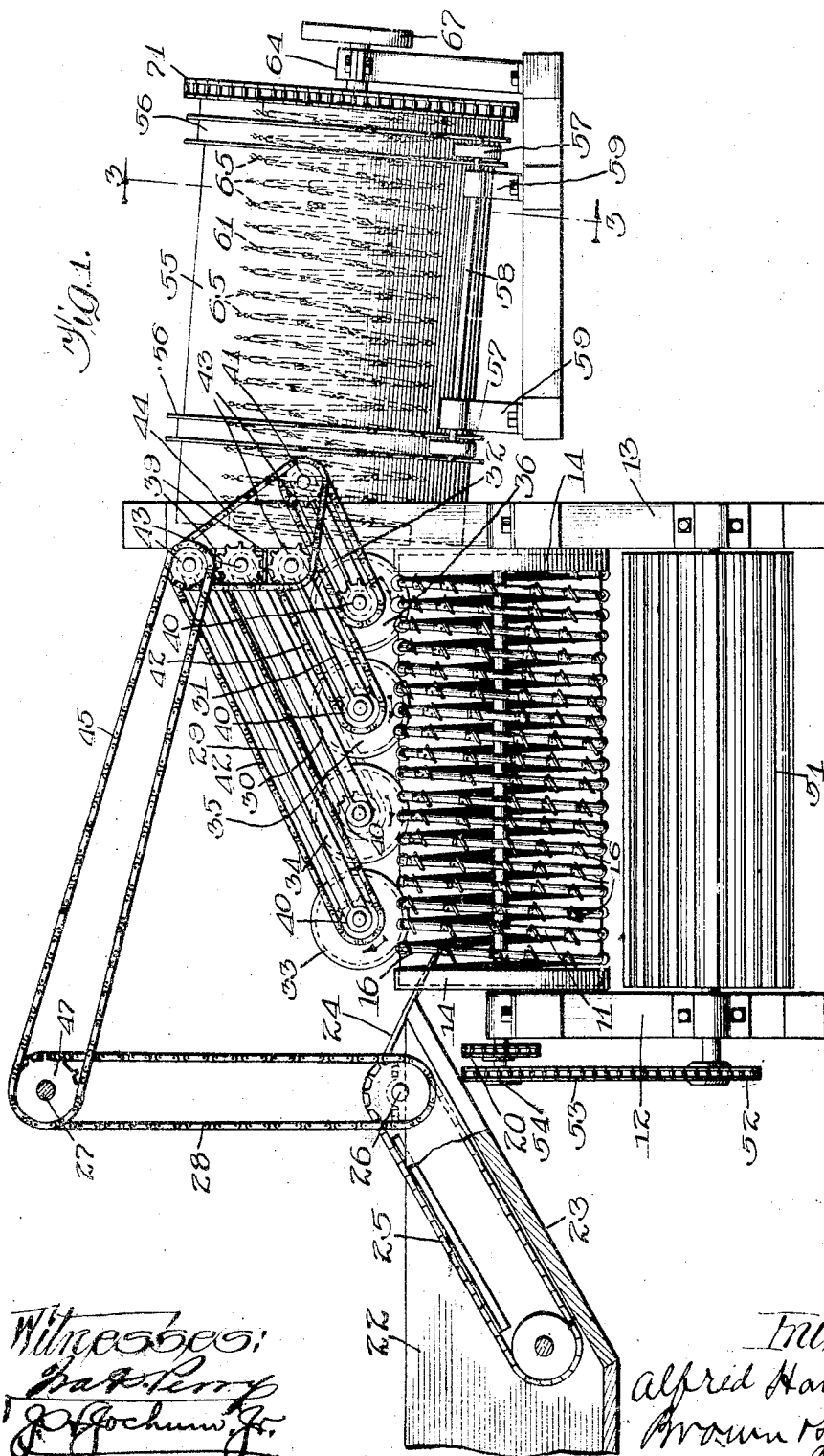

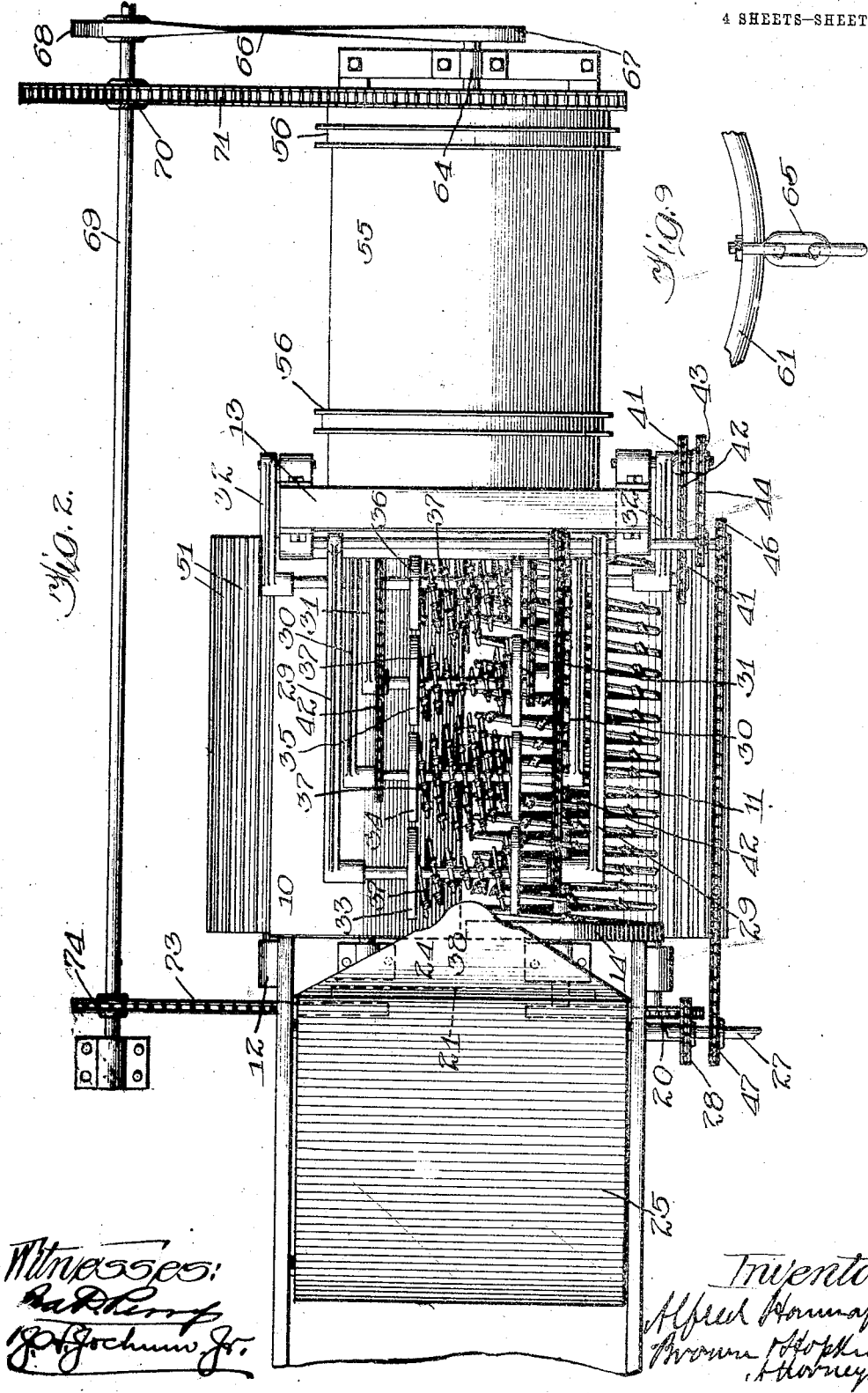

A. HANNAFORD.
HOG SCRAPER AND CONVEYER.
APPLICATION FILED JULY 15, 1907.
1,080,007.
Patented Dec. 2, 1913.
4 SHEETS—SHEET 3.
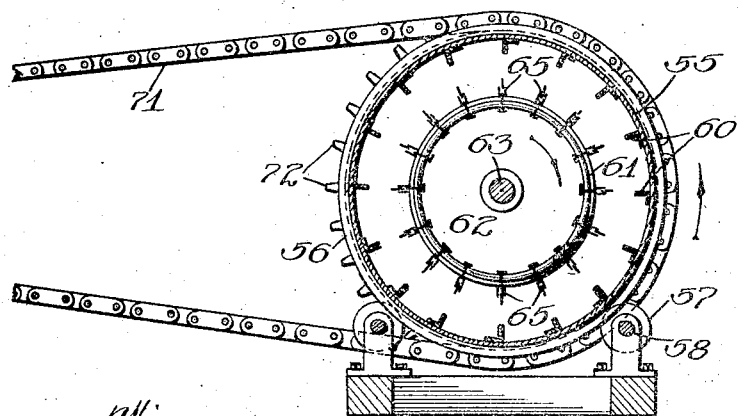
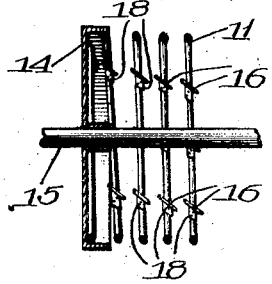
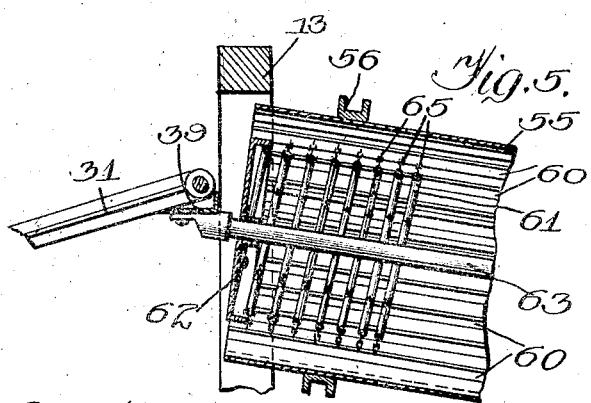
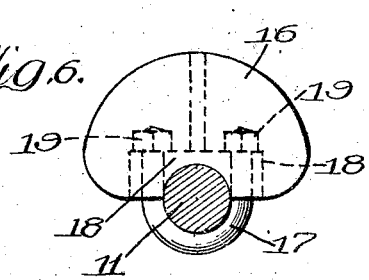
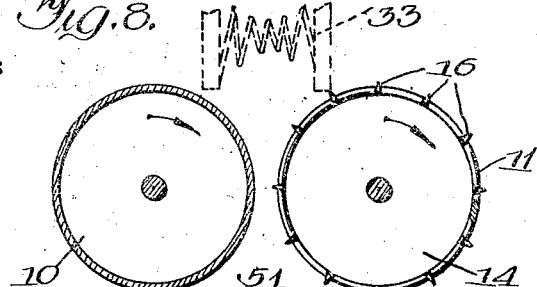
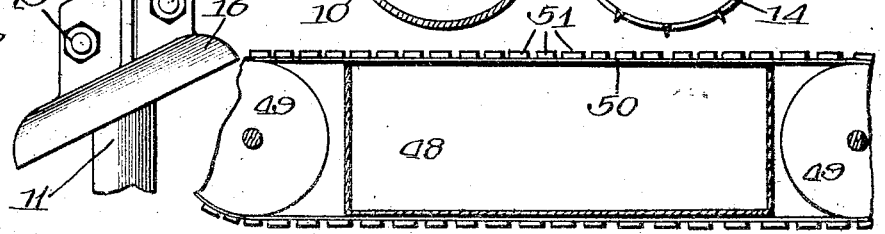

A. HANNAFORD.
HOG SCRAPER AND CONVEYER.
APPLICATION FILED JULY 15, 1907.

1,080,007.

Patented Dec. 2, 1913.

4 SHEETS—SHEET 4.

Witnesses:

Inventor:
Alfred Hannaford

UNITED STATES PATENT OFFICE.

ALFRED HANNAFORD, OF CHICAGO, ILLINOIS.

HOG SCRAPER AND CONVEYER.

1,080,007.

Specification of Letters Patent.

Patented Dec. 2, 1913.

Application filed July 15, 1907. Serial No. 383,834.

*To all whom it may concern:*

Be it known that I, ALFRED HANNAFORD, a citizen of the United States, residing at Chicago, in the county of Cook and State of Illinois, have invented certain new and useful Improvements in Hog Scrapers and Conveyers, of which the following is a specification.

This invention relates to improvements in hog scraping and conveying machines, and the primary object of the invention is to provide an improved machine of this character for rapidly and thoroughly removing the hair, bristles and dirt from the carcass.

A further object of the invention is to provide a hog-dehairing machine having power-driven and rotarily-acting flexible scraper-mechanism and coöperatively power-driven and rotarily-acting conveyer mechanism adapted to freely and completely support the carcass and at the same time roll it laterally and advance it longitudinally while presenting it to the simultaneous dehairing-action of the scraper-mechanism, without said carcass being grappled to the said or other advancing means, the said carcass being free of any grappling to any advancing means.

A further object of the invention is to provide an improved scraper which will also convey or advance the carcass through the machine.

A further object is to provide an improved support for the carcass which also serves to convey the carcass through the machine.

A further object is to provide an improved spiral conveyer for supporting and advancing the carcass, and improved scrapers secured to the conveyer.

A further object is to provide an improved spiral conveyer and scraper for the carcass and improved scrapers coöperating therewith and arranged transversely of the line of travel of the carcass through the machine.

A further object is to provide improved means for feeding the carcass to the machine.

A further object is to provide an improved scraper and conveyer and improved means for polishing the carcass when scraped.

A further object is to provide an improved scraper and conveyer and a plurality of yielding scrapers coöperating therewith and arranged transversely of the line of travel of the carcass through the machine.

A further object is to provide an improved machine of this character which will be simple, cheap and durable in construction and effective and efficient in operation.

To the attainment of these ends and the accomplishment of other new and useful objects, as will appear, the invention consists in the features of novelty in the construction, combination and arrangement of the several parts hereinafter more fully described and claimed, and shown in the accompanying drawings illustrating an exemplification of the invention, and in which—

Figure 11:
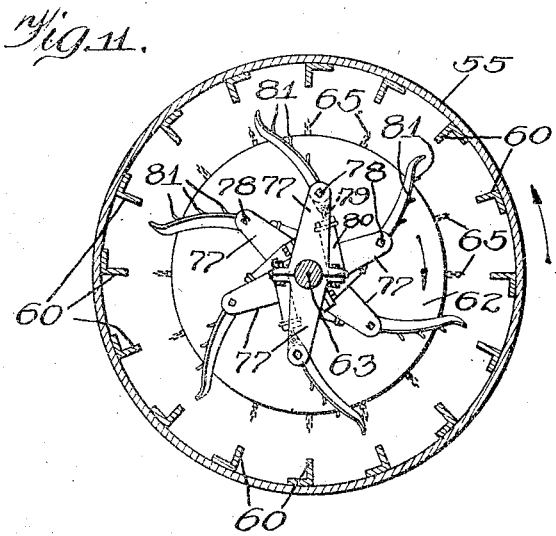

Figure 1 is a side elevation of an improved machine of this character constructed in accordance with the principles of this invention. Fig. 2 is a top plan view of Fig. 1. Fig. 3 is a sectional view on line 3—3 of Fig. 1. Fig. 4 is a detail sectional view of the improved conveyer and scraper. Fig. 5 is a detail sectional view of a portion of the polishing mechanism. Fig. 6 is an elevation of one of the scrapers. Fig. 7 is a top plan view of Fig. 6. Fig. 8 is a diagrammatic view showing the relative positions of the conveyer and scraper and supporting drum and the conveyer for removing the hair from the top of the tank. Fig. 9 is a detail view of one of the flexible polishing members. Fig. 10 is a longitudinal sectional view partly in elevation of a modified form of polishing mechanism. Fig. 11 is an end elevation of Fig. 10.

Referring more particularly to the drawings and in this exemplification of the invention, the numerals 10, 11 designate spaced parallel drums which are journaled between suitable uprights or frames 12, 13. These drums may be of any desired length and diameter and are arranged in the same horizontal plane. The drum 10 is preferably provided with a smooth periphery and the drum 11 is constructed of any suitable flexible material, such as heavy wire, or the like, coiled to form a spiral having spaced convolutions, the ends of the wire being secured to suitable heads 14, as shown more clearly in Fig. 4 of the drawings. The axle 15 of the drum 11 preferably passes through the center of the drum and extends beyond the heads 14 so that the drum 11 will form a flexible or yielding support for the carcass when it rests thereon, and also serve as means for taking up the jar on the axle or bearings when the carcass is dumped by the drum 10 in a manner to be hereinafter set forth.

Secured to the convolutions of the spiral 11 are detachable scraping devices or blades 16 which are arranged throughout the entire length of the spiral and project beyond the periphery of the drum 11, being spaced from the drum 10 to permit the drums to rotate without the scraping devices contacting with the periphery of the other drum. These scraping devices or blades 16 may be secured in position in any desired or suitable manner, preferably by means of suitable U bolts 17 which stand astride of the respective convolutions with the extremities passing through the base 18 of the scraping devices 16, and the scrapers and bolts may be secured in position by suitable nuts 19 engaging the free ends of the bolts. These scraping devices are disposed transversely of the respective convolutions and diagonally with relation thereto, as shown more clearly in Figs. 4 and 7 of the drawings. Secured to one end of the axles of the respective drums is a suitable sprocket wheel 20, and passing over said sprocket wheel is an endless chain or belt 21 for simultaneously rotating the drums in the direction indicated by the arrows in Fig. 8 of the drawings.

Arranged adjacent the forward end of the drums is a suitable scalding tank 22 which is preferably provided with an inclined extremity 23 in close proximity to the ends of the drums and leading from the top of this extremity 23 is a chute 24 which preferably tapers toward the free extremity thereof and terminates at a point adjacent the space between the drums 10 and 11 and serves to direct and properly position the carcass on the drums.

Arranged within the tank 22 and adjacent the extremity 23 thereof is a suitable endless conveyer or elevator 25 for elevating the carcass from the tank 22 and conveying it to and depositing it upon the incline or chute 24. The conveyer or elevator 25 may be operated from the shaft 26 to which motion is imparted by means of a driving shaft 27 through the medium of a belt or chain 28.

The rear framework 13 preferably extends some distance above the tops of the drums 10 and 11, and is located in close proximity to the other ends thereof. Pivotally supported to the rear frame 13 and by one end thereof are a plurality of spaced arms 29, 30, 31, 32. The pivoted ends of these arms are preferably superposed with relation to each other, and the arms are of such a length that the free ends thereof will terminate adjacent the tops of the drums 10, 11.

Arranged between each of the respective pairs of arms are yielding scrapers 33, 34, 35, 36, each of which is preferably constructed of a suitable piece of flexible material 37, such as wire or the like, coiled or bent to form a spiral having spaced convolutions, and these scrapers are journaled between the respective pairs of arms by means of suitable axles extending beyond the ends of the scrapers and resting in suitable bearings in the arms. The arms 29 are of such a length that the scraper 33 supported thereby will stand in close proximity to the tops of the drums 10, 11, adjacent the forward end thereof, and the remaining arms are of such a relative length that the respective scrapers 34, 35, 36 will be arranged behind the scraper 33 and in the same longitudinal and horizontal plane and will normally stand adjacent the peripheries of the drums 10 and 11. Secured to the convolutions of the spirals 37 of each of the scrapers are a plurality of spaced scraping devices 38, which are similar in construction to the scraping device 16 and are secured to the convolutions of the spirals 37 in a similar manner, so as to project beyond the peripheries thereof. These scrapers 33, 34, 35 and 36 are arranged to extend transversely across the space formed between the drums 10 and 11, and any suitable means may be provided for holding the scrapers out of contact with the peripheries of the drums, such as brackets 39, which may be secured to the framework 13, and which are adapted to be engaged by the arms 29, 30, 31 and 32. Secured to each of the shafts of the respective scrapers 33, 34, 35, 36, is a sprocket wheel 40, shown more clearly in Fig. 1 of the drawing, and secured adjacent the other ends of the respective arms is a sprocket 41. Passing around the respective sprockets at the extremities of the arms is a sprocket chain 42, by means of which the respective scrapers may be rotated in a direction opposed to the direction of the advancement of the carcass by means of the drum or conveyer 11. Secured to the shaft which supports the respective sprockets 41 is a similar sprocket 43, and passing around these sprockets 43 is a sprocket chain 44 which serves to simultaneously rotate the sprockets 40. Motion may be imparted to the respective scrapers through the medium of sprocket chains 42, and the sprocket wheels 41, sprockets 43, sprocket chain 44, by means of a suitable sprocket chain 45 engaging a sprocket 46 on one of the supporting shafts of the sprockets 41 and a suitable sprocket wheel 47 secured to the driving shaft 27.

Arranged below the drums 10, 11, is a tank or receptacle 48 which is adapted to receive the hair which has been removed from the carcass and which is washed from the carcass as usual, and which latter it is not necessary to illustrate.

Journaled adjacent the sides of the tank 48 are suitable pulleys 49, and passing around said pulleys is an endless belt 50 which is arranged to pass transversely of the tank with relation to the drums 10, 11, and in such a manner that the upper run of the belt will pass across and in close proximity to the top edges of the walls of the tank. Secured to the belt 50 are spaced slats or strips 51 which extend across the tank and in a direction parallel with the drums 10, 11. Motion may be imparted to the belt 50 and slats 51 by means of a suitable sprocket wheel 52 secured to one of the pulleys 49 and which sprocket receives motion by means of a suitable sprocket chain or belt 53 which is driven by means of another sprocket wheel 54, secured preferably to the axle of one of the drums 10, 11. The hair being removed from the carcass, will drop upon the slats 51 and will float upon the surface of the water in the tank. The belt 50 moving across the top of the tank will remove the hair which is supported by the slats 51 and also scrape or skim the hair from the top of the water, thereby cleansing the water in the tank of the hair and permitting the water to be used over again for washing the carcass in the ordinary and well known manner.

Arranged adjacent the extremities of the drums 10, 11, remote from the tank 22, is a cylinder or drum 55 which may be of any desired length and diameter and constructed of any suitable material. This drum is provided with peripheral tracks or ways 56 located adjacent the extremities thereof, and is supported in an inclined position, with one extremity in close proximity to the ends of the drums 10, 11, and with its periphery below the tops of the drums 10, 11, by means of suitable pulleys 57 secured to the shaft 58, journaled in suitable bearings 59; the pulleys being disposed to run within the guides or ways 56 to permit the drum or cylinder to be readily rotated and to hold the same against longitudinal displacement with relation to the drums 10, 11. Secured within the drum or cylinder 55 and extending longitudinally thereof are spaced ribs or projections 60. Located within the drum or cylinder 55 is a yielding drum 61 which may be constructed in any desired or suitable manner, preferably by means of a piece of flexible material, such as wire or the like, coiled to form a spiral similar to the drum 11 and having spaced convolutions. The extremities of the spiral may be secured to suitable heads 62, shown more clearly in Fig. 5 of the drawings, and said drum is of an external diameter somewhat smaller than the internal diameter of the drum or cylinder 55, so as to form a space between the wall of the latter and the periphery of the drum 61. This drum 61 may be supported for independent rotation within the drum or cylinder 55 in any desired and well known manner, preferably by means of the extremity of the supporting shaft 63 which passes through the heads 62, being journaled in suitable bearings 64. Secured to the convolutions of the coil comprising the drum 61, and in such a manner as to extend beyond the periphery of the convolutions are a plurality of flexible members 65 which preferably comprise a series of metallic links shown more clearly in Fig. 9 of the drawings, and said flexible member 65 is of such a length as to terminate short of the ribs or projections 60 in the drum or cylinder 55 so that when either the drum 61 or the cylinder 55 is rotated with respect to each other, the flexible member 65 will not engage the ribs or projections 60.

The drum 61 may be rotated by means of a suitable belt 66 which engages a suitable pulley 67 on the axle 63, and also a suitable pulley 68 on a shaft 69 which may be driven from any source of power (not shown). The drum or cylinder 55 may be driven from the shaft 69 by means of a suitable sprocket wheel 70 secured thereto and a sprocket chain 71 which passes around the sprocket 70 and also around suitable peripheral teeth 72 on the drum or cylinder 60. The belt 66 is preferably crossed as shown in Fig. 2 of the drawing, so that when the shaft 69 is rotated, the drum or cylinder 55 will be rotated in the direction indicated by the arrows shown in Fig. 3 of the drawing, while the drum 61 will be rotated in the direction also indicated by the arrow in Fig. 3, that is, the two drums will be rotated in an opposite direction with relation to each other so that when the carcass is passed into the cylinder 55 by means of the conveyer drum 11, the ribs 60 in the cylinder or drum 55 will engage and tend to raise the carcass and tumble it, while the drum 61 is rotating in the opposite direction, thereby causing the flexible member 65 to engage and rub across the carcass for polishing the same. Motion may be imparted to the drum 10 preferably by means of a sprocket chain 73, which passes over a suitable sprocket wheel 74 on the shaft 69 and a suitable sprocket wheel on the axle of the drum.

In operation, the carcass is deposited in the scalding tank 22 and is floated by the operator pushing the same toward the end less conveyer or elevator 25, and by holding the carcass in engagement with the elevator it will be raised by the elevator out of the tank 22 and deposited upon the incline or chute 24, from where it passes on to the drums 10, 11, at a point adjacent the space between the drums. The drums being rotated in the directions indicated by the arrows in Fig. 8 of the drawing, the scraping devices 16 on the drum 11 will tend to raise the carcass on that side and the drum 10 will tend to shove or pull the carcass downwardly against the drum 11, the flexibility of the drum 11 tending to overcome the jar caused by the tumble of the carcass. When the carcass is deposited upon the drums 10, 11, the convolutions of the coil will advance the carcass, and as it advances it passes under the transversely disposed scrapers 33, 34, 35 and 36, which will be held by gravity upon the carcass. These scrapers are rotated in the direction indicated by the arrows in Fig. 1 of the drawings, that is, in a direction opposed to the direction of the advancement of the carcass, and being flexible, will conform to the contour of the carcass. The scrapers are alternately provided with a concave and a convex periphery so as to engage each portion of the surface of the carcass and to pass between the flanks of the carcass as it passes through the machine. As the carcass is conveyed or advanced by the drum 11, the scrapers 16 thereon will also remove the hair and particles therefrom, and when it has reached the end of the drums 10, 11, it will be deposited into the drum or cylinder 55, where it will be tumbled and polished in the manner as above set forth.

It will thus be seen that with this improved construction of conveyer the carcass will be rapidly dehaired and advanced through the machine, and the conveyer being flexible, will conform to the contour of the carcass, and the scrapers which are arranged transversely of the line of travel of the carcass being also flexible, will conform to the contour of the carcass, thereby thoroughly removing every particle of hair and rapidly cleaning the same.

In the exemplification shown in Figs. 10 and 11 of the drawings, the yielding drum 61 extends for only a portion of the length of the cylinder 55 and is arranged preferably adjacent the rear end thereof, that is, one end of the yielding drum 61 is secured at a point substantially midway of the length of the shaft 63 within the drum or cylinder 55, and the other end terminates adjacent the rear end of the drum or cylinder. Secured for rotation with the shaft 63 and arranged within the drum or cylinder 55 in advance of the yielding drum 61 are a plurality of flexibly mounted beater or scraper arms 75, 76. These arms are preferably arranged in pairs secured for rotation with the shaft 63, and diametrically opposite each other, and are arranged in staggered relation with each other throughout the length of the shaft 63. These beater or scraper arms preferably comprise a support 77, which is secured for rotation with the shaft and on opposite sides thereof. The arms proper are pivotally mounted intermediate their ends, as at 78, shown more clearly in Fig. 11 of the drawings, and a tension device preferably comprising two elements 79, 80 is provided for each of the arms, the specific construction of which forms no part of the present invention but constitutes the subject matter of a separate application filed by me, Serial No. 383,835. One of the elements, preferably the element 79, is pivotally connected to the adjacent end of the respective arms, and the other element 80 is connected to the support 77, preferably adjacent the shaft 63. Each of the arms is provided with a plurality of scraping blades 81 which are arranged on opposite faces thereof, so that when the shaft 63 is rotated to cause the scraper or beater arms to rotate in the direction indicated by the arrow in Fig. 11 of the drawings, the scraping blades 81 will engage the carcass and the rotation of the cylinder 55 in the direction of the arrow shown in Fig. 11 will tumble the carcass to present a new surface to the scraper or beater arms as the latter are rotated, the tension devices serving as a means to centralize the arms with relation to the supports 77 to properly position them to engage the carcass and at the same time permit the arms or beaters to be yielding so that the flesh of the carcass will not be lacerated or injured. The arms 75 in this exemplification of the invention are preferably shown as double arms spaced from each other, that is, each arm comprises two members spaced from each other to form an intervening space 82, so as to permit one of the arms to pass on each side of the legs of the carcass to properly engage the same while the arms 76 are shown as single arms. Thus it will be seen that with this exemplification of the invention, after the carcass has been scraped and passed into the drum or cylinder 55, it will be engaged by the rotary beater or scraper arms, which latter will tend to remove any of the hair or foreign matter which still adheres to the carcass, and that while being engaged by these arms, the carcass will be tumbled to present a new surface to the arms, after which it will pass forward in the cylinder 55 to be engaged by the flexible polishing members 65 on the yielding drum 61.

In order that the invention might be fully understood by those skilled in the art, the details of the foregoing embodiment thereof have been thus specifically described, but

What I claim as new and desire to secure by Letters Patent is:—

1. In a hog-dehairing machine, a conveyer including an axially rotatable element for advancing the carcass and scraping devices rotatable with the said element and about the same axis and projecting radially outward therefrom, said scraping devices moving transversely of the direction of travel of the carcass and acting to scrape it while it is being conveyed.

2. In a hog-dehairing machine, a conveyer including an axially rotatable element for supporting and conveying the carcass and scrapers rotatable with the said element and about the same axis and projecting radially outward therefrom, said scrapers moving transversely of the direction of travel of the carcass and acting to scrape it while it is being conveyed.

3. In combination a conveyer including an axially rotatable element for supporting and conveying the carcass and scrapers rotatable with the said element and about the same axis, said scrapers projecting beyond the periphery of the said element and moving transversely of the direction of travel of the carcass and acting to scrape it while it is being conveyed.

4. The combination of a conveying element supporting the carcass and scraping devices secured to the said element, and projecting radially outward therefrom, said scraping devices moving transversely of the direction of travel of the carcass and acting to scrape it while it is being conveyed.

5. In combination with an axially rotatable element for conveying the carcass and supporting it, scraping devices secured to the periphery thereof, and means for rotating the said element, said scraping devices moving transversely of the direction of travel of the carcass and acting to scrape it while it is being conveyed.

6. In combination a conveyer including an axially rotatable yielding element for conveying the carcass, scraping devices secured thereto and means for rotating the said element.

7. In combination a conveyer including a spiral supporting element for conveying the carcass, scraping devices secured to said element and means for rotating the element.

8. In combination a conveyer including a spiral conveying element comprising spaced convolutions, scraping devices secured to and projecting beyond the periphery thereof, the carcass being engaged and advanced by the periphery of the said element and means for rotating the element.

9. The combination of a conveyer for supporting and advancing the carcass, including a conveying element consisting of a spiral comprising spaced convolutions, scraping devices secured to the periphery thereof and means for rotating the element.

10. The combination of a conveyer for supporting and advancing the carcass, said conveyer including a conveying element consisting of a spiral comprising spaced convolutions, scraping devices detachably secured to the periphery of the said element throughout the length thereof and means for rotating the element.

11. The combination of spaced parallel drums for supporting the carcass, one of said drums comprising a spiral having spaced convolutions for advancing the carcass, a scraper supported by the periphery of one of the drums and means for simultaneously rotating the drums.

12. The combination of spaced parallel drums for supporting the carcass, one of said drums comprising a spiral having spaced convolutions for advancing the carcass, spaced scraping devices supported by the periphery of one of the drums, and means for rotating drums in the same direction.

13. The combination of spaced parallel drums for supporting the carcass, one of said drums being provided with a smooth periphery, the other drum comprising a coil having spaced convolutions for advancing the carcass, scraping devices secured to the convolutions and projecting beyond the periphery of the drum and means for rotating the drums in the same direction.

14. The combination of spaced parallel drums for supporting the carcass, one of said drums being provided with a smooth periphery, the other drum comprising a coil having spaced convolutions for advancing the carcass, scraping devices secured to the convolutions and projecting beyond the periphery of the drum, means for rotating the drums in the same direction, and means for holding the carcass in contact with the drums.

15. The combination of spaced parallel drums for supporting and conveying the carcass, one of said drums being provided with a smooth periphery, spaced scraping devices secured to the periphery of the other drum, said devices being disposed diagonally with relation to the axis of the drum and adapted to engage and scrape the carcass during its advancement, and means for rotating the drums.

16. The combination of an axially rotatable conveyer drum having a yielding periphery, a smooth drum parallel and coöperating with the conveyer drum for supporting the carcass, spaced scrapers secured to the periphery of the yielding drum and disposed diagonally with relation to the axis of the drum, said scrapers being adapted to engage and scrape the carcass during its advancement and means for simultaneously rotating the drums in the same direction.

17. In combination in a hog scraping machine a conveyer including supporting elements, one of which is axially rotatable to convey the carcass, a scraper disposed externally of said conveyer elements and above the path of movement of the carcass, means for supporting the scraper, and means for rotating the conveying element.

18. In combination in a hog scraping machine a conveyer including supporting elements, one of said elements being axially rotatable to convey the carcass, a scraper disposed externally of said conveyer elements and above the path of movement of the carcass, means for supporting and means for operating the scraper, and means for rotating the said element.

19. In combination in a hog scraping machine a conveyer including supporting elements, one of which is axially rotatable to convey the carcass, an axially rotatable scraper disposed externally of said conveyer elements and above the path of movement of the carcass, means for supporting the scraper adjacent the conveyer, means for rotating the scraper, and means for imparting motion to the said rotatable element.

20. In combination in a hog scraping machine a conveyer including supporting elements, one of which is axially rotatable to convey the carcass, an axially rotatable yielding scraper disposed externally of said conveyer elements and above the path of movement of the carcass, means for supporting the scraper adjacent the conveyer, means for rotating the scraper and means for rotating the said conveying element.

21. In combination in a hog scraping machine, a conveyer including supporting elements, one of which is axially rotatable to convey the carcass, an axially rotatable yielding gravity scraper disposed transversely of the path of movement of and adapted to engage the carcass, means for supporting the scraper, means for operating the scraper, and means for rotating the said conveying element.

22. In combination in a hog scraping machine, a conveyer including supporting elements, one of which comprises a spiral for conveying the carcass, a pivotally supported rotatable scraper, adjacent the conveying element and disposed externally of said conveyer elements and above the path of movement of the carcass, means for operating the scraper and means for operating the said conveying element.

23. In combination in a hog scraping machine, a conveyer including supporting elements, one of which comprises a spiral for conveying the carcass, a rotatable scraper disposed externally of said conveyer elements and above the path of movement of and adapted to engage the carcass, means for operating the said spiral element to advance the carcass, and means for rotating the scraper in a direction opposed to the direction of movement of the carcass.

24. In combination in a hog scraping machine, a conveyer including supporting elements, one of which is axially rotatable to convey the carcass, scraping devices secured to the rotatable element, a scraper disposed externally of said conveyer elements and above the path of movement of and adapted to engage the carcass during its advancement by the conveying element, means for operating the last said scraper and means for rotating the said conveying element.

25. In combination in a hog scraping machine, a conveyer including supporting elements, one of which is axially rotatable to convey the carcass, a plurality of rotatable scrapers disposed transversely of the path of movement of the carcass, alternate scrapers being respectively provided with a concave and a convex periphery, means for rotating the scrapers and means for rotating the said conveying element.

26. In combination in a hog scraping machine, a conveyer including supporting elements, one of which is axially rotatable to convey the carcass, a plurality of rotatable yielding scrapers disposed externally of said conveyer elements and above the path of movement of the carcass, alternate scrapers being respectively provided with a concave and a convex periphery, means for rotating the scrapers and means for rotating the conveying element.

27. In combination in a hog scraping machine including axially rotatable members for supporting the carcass, one of said members comprising a spiral for advancing the carcass, scrapers secured to said spiral and adapted to engage and scrape the carcass as it is advanced by the spiral, means for rotating the members, means for feeding the carcass to the members, a scraper supported above the members and transversely of the path of movement of the carcass, and means for operating the scraper.

28. In combination in a hog scraping machine including axially rotatable members for supporting the carcass, one of said members comprising a yielding spiral for advancing the carcass, scrapers secured to said spiral and adapted to engage and scrape the carcass as it is advanced by the spiral, means for rotating the members, means for feeding the carcass to the members, a scraper supported above the members and transversely of the path of movement of the carcass, means for operating the scraper and a conveyer disposed below and adapted to receive and convey away the hair removed by the scrapers.

29. In combination in a hog scraping machine, a conveyer including an axially rotatable combined scraper and conveyer element for the carcass, means for rotating the element, a scraper arranged externally of said conveyer elements and above the path of movement of the carcass, means for operating the scraper, a tank disposed below the conveyer, an endless conveyer passing across the tank and engaging the upper edges thereof and movable transversely with relation to the first said conveyer, said endless conveyer being adapted to receive the hair removed by the scrapers and means for operating the said endless conveyer.

30. In combination in a hog scraping machine, a conveyer including an axially rotatable conveying and scraper element, a scraper disposed externally of and above the conveyer element, means for operating the conveying element to advance the carcass, a receptacle for receiving the carcass from the conveyer after being scraped, and means for polishing the carcass while in the receptacle.

31. In combination in a hog scraping machine, a conveyer including an axially rotatable conveying and scraper element, a scraper disposed transversely of and above the conveyer means for operating the conveying element to advance the carcass, a receptacle for receiving the carcass from the conveyer after being scraped and through which it passes, and means for polishing the carcass as it passes through the receptacle.

32. In combination in a hog scraping machine, a conveyer including an axially rotatable conveyer and scraper element, a scraper disposed transversely of and above the conveyer, means for operating the conveying element to advance the carcass, a receptacle for receiving the carcass from the conveyer after being scraped and means for polishing the carcass while in the receptacle, said means including a tumbling and a rubbing mechanism.

33. In combination in a hog scraping machine including conveying and scraping mechanism, an open rotatable inclined cylinder for receiving the carcass from the conveyer, longitudinal ribs secured within and projecting from the wall of the cylinder, means for rotating the cylinder, a drum supported within and rotatable independently of the cylinder, flexible members secured to the periphery of the drum and means for rotating the drum independently of the cylinder.

34. In combination in a hog scraping machine, including conveying and scraping mechanism, an open rotatable inclined cylinder for receiving the carcass from the conveyer, longitudinal ribs secured within and projecting from the wall of the cylinder, means for rotating the cylinder, a drum having a yielding periphery and supported within and rotatable independently of the cylinder, flexible members secured to the periphery of the drum and means for rotating the drum independently of and in a direction opposed to the direction of rotation of the cylinder.

35. In combination in a hog scraping machine including conveying and scraping mechanism, an open cylinder supported in close proximity to and adapted to receive the carcass from the conveyer, means for rotating the cylinder for raising and tumbling the carcass, a spiral drum comprising spaced convolutions within the cylinder and supported for independent rotation with respect thereto, flexible members secured to the convolutions throughout the length of the drum and projecting beyond the periphery thereof, and means for rotating the spiral drum in a direction opposed to the direction of rotation of the cylinder, the flexible member being of a length to engage and rub across the carcass.

36. In combination in a hog scraping machine, a conveyer including supporting elements, one of said elements comprising a spiral scraper adapted to convey the carcass, means for operating the said element, a spiral scraper disposed above the said scraper and conveyer element and transversely of the path of movement of the carcass, and means for operating the last said scraper.

37. In combination in a hog scraping machine, a conveyer including a yielding spiral scraper and conveyer element for the carcass, means for operating the same, a yielding spiral scraper disposed above the said scraper and conveyer element and transversely of the path of movement of the carcass, and means for rotating the last said scraper.

38. In a hog-dehairing machine, in combination: power-driven and rotarily-acting flexible scraper-mechanism; and coöperatively power-driven and rotarily-acting conveyer-mechanism, axially positioned outside of the scraper-mechanism and adapted to freely and completely support the carcass and at the same time roll it laterally and advance it longitudinally while presenting it to the simultaneous dehairing-action of the scraper-mechanism, said carcass being free of any grappling to the advancing means; said conveyer-mechanism being provided with spirally-acting means for so advancing said carcass; substantially as specified.

39. In a hog-dehairing machine, in combination: power-driven and rotarily-acting flexible scraper-mechanism; and coöperatively power-driven and rotarily-acting conveyer-mechanism, axially positioned outside of the scraper-mechanism and adapted to freely and completely support the carcass and at the same time roll it laterally and advance it longitudinally while presenting it to the simultaneous dehairing-action of the scraper-mechanism, said carcass being free of any grappling to the advancing means; said conveyer-mechanism being provided with spirally disposed ribs that are adapted to so advance said carcass; substantially as specified.

40. In a hog-dehairing machine, in combination: a power-driven rotating shaft bearing flexibly-mounted scrapers; and coöperatively power-driven and rotarily-acting conveyer-mechanism, axially positioned outside of the scraper mechanism and adapted to freely and completely support the carcass and at the same time roll it laterally and advance it longitudinally while presenting it to the simultaneous dehairing-action of the scraper-mechanism, said carcass being free of any grappling to the advancing means; the aforesaid shaft being disposed in a position substantially paralleling the face of said conveyer-mechanism upon which such carcass is so supported and rolled and advanced; substantially as specified.

41. In a hog-dehairing machine, in combination: power-driven and rotarily-acting flexible scraper-mechanism provided with scraper-elements spirally disposed about a rotating axis that lies in a plane substantially paralleling the direction in which the carcass being scraped is advanced; and coöperatively power-driven and rotarily-acting conveyer-mechanism, axially positioned outside of the scraper-mechanism and adapted to freely and completely support the carcass and at the same time roll it laterally and advance it longitudinally while presenting it to the simultaneous dehairing-action of the scraper-mechanism, said carcass being free of any grappling to the advancing means; substantially as specified.

42. In a hog-dehairing machine, in combination: a power-driven rotating shaft bearing flexibly-mounted scrapers; and coöperatively power-driven and rotarily-acting conveyer-mechanism adapted to freely and completely support the carcass and at the same time roll it laterally and advance it longitudinally while presenting it to the simultaneous dehairing-action of the scraper-mechanism, said carcass being free of any grappling to the advancing means; said conveyer-mechanism being provided with a plurality of mutually parallel and similarly rotating rollers that conjointly support and roll the carcass; one of said rollers including means for advancing such rolling carcass as aforesaid; substantially as specified.

43. In a hog-dehairing machine, in combination: power-driven and rotarily-acting flexible scraper-mechanism; and coöperatively power-driven and rotarily-acting conveyer-mechanism adapted to freely and completely support the carcass and at the same time roll it laterally and advance it longitudinally while presenting it to the simultaneous dehairing-action of the scraper-mechanism, said carcass being free of any grappling to the advancing means; said conveyer-mechanism being provided with a plurality of mutually parallel and similarly rotating rollers that conjointly support and roll the carcass, one of said rollers including spirally-acting means for advancing said carcass as aforesaid; substantially as specified.

44. In a machine of the class described flexible scraping mechanisms acting downwardly upon the carcasses and means for supporting and rotating said carcasses while being acted upon by the scrapers.

45. In a device of the class described the combination with means for simultaneously rotating, conveying and supporting carcasses of automatic means acting to remove the bristles and dirt from the carcasses.

46. In a device of the class described a plurality of yieldable rotatable means coacting to support, rotate, advance, and dehair the carcass.

47. In a hog-dehairing machine, in combination; a power-driven rotating shaft bearing flexibly-mounted scrapers; and coöperatively power-driven and rotarily-acting conveyer-mechanism adapted to freely and completely support the carcass and at the same time roll it laterally and advance it longitudinally while presenting it to the simultaneous dehairing action of the scraper mechanism, said carcass being free of any grappling to the advancing means; said conveyer-mechanism including a plurality of mutually parallel and similarly rotating conveyer-rollers that conjointly and severally act to so advance said carcass; substantially as specified.

48. In a hog-dehairing machine, in combination: a power-driven rotating shaft, scrapers thereon and coöperatively power-driven and rotarily-acting conveyer mechanism adapted to freely and completely support the carcass and at the same time advance it longitudinally while presenting it to the simultaneous dehairing-action of the scraper-mechanism, said conveyer mechanism including a plurality of mutually parallel and similarly rotating conveyer rollers that conjointly and severally act to so advance said carcass.

49. In a device of the class described supporting and rotating means for the carcass, and a plurality of yieldable scrapers acting downwardly and upwardly simultaneously on the rotating carcass.

50. In a device of the class described means for supporting and rotating a carcass, and resilient scraping means acting upwardly and downwardly simultaneously on said carcass.

In testimony whereof I have signed my name to this specification, in the presence of two subscribing witnesses, on this 11th day of July A. D. 1907.

ALFRED HANNAFORD.

Witnesses:
J. H. JOCHUM, Jr.,
M. W. CANTWELL.